METHOD AND APPARATUS FOR PROGRAMMING

Filed Sept. 27, 1962 6 Sheets-Sheet 1

INVENTORS.
ALEX JUST
RICHARD T. KRAUSE
FRANK A. KUKLA
BY
Byron, Hume, Groen & Clement
ATTORNEYS.

METHOD AND APPARATUS FOR PROGRAMMING

INVENTORS.
ALEX JUST
RICHARD T. KRAUSE
FRANK A. KUKLA
BY
Byron, Hume, Groen & Clement
ATTORNEYS.

METHOD AND APPARATUS FOR PROGRAMMING

Filed Sept. 27, 1962 6 Sheets-Sheet 3

INVENTORS.
ALEX JUST
RICHARD T. KRAUSE
FRANK A. KUKLA
BY
Byron, Hume, Groen & Clement
ATTORNEYS.

METHOD AND APPARATUS FOR PROGRAMMING

Filed Sept. 27, 1962 6 Sheets-Sheet 4

INVENTORS.
ALEX JUST
RICHARD T. KRAUSE
FRANK A. KUKLA
BY
Byron, Hume, Groen & Clement
ATTORNEYS.

METHOD AND APPARATUS FOR PROGRAMMING

Filed Sept. 27, 1962 6 Sheets-Sheet 5

INVENTORS.
ALEX JUST
RICHARD T. KRAUSE
FRANK A. KUKLA
BY
Byron, Hume, Groen & Clement
ATTORNEYS.

METHOD AND APPARATUS FOR PROGRAMMING

Filed Sept. 27, 1962 6 Sheets-Sheet 6

INVENTORS.
ALEX JUST
RICHARD T. KRAUSE
FRANK A. KUKLA

BY

Byron, Hume, Groen & Clement
ATTORNEYS.

United States Patent Office 3,213,406
Patented Oct. 19, 1965

3,213,406
METHOD AND APPARATUS FOR PROGRAMMING

Alex Just, River Forest, Richard T. Krause, Barrington Hills, and Frank A. Kukla, Riverside, Ill., assignors, by mesne assignments, to Malco Manufacturing Company, Inc., Chicago, Ill., a corporation of Illinois

Filed Sept. 27, 1962, Ser. No. 226,552
6 Claims. (Cl. 339—184)

The present application is a continuation-in-part of a prior application, Serial No. 191,987, filed May 2, 1962, and assigned to the assignee of the present application.

This invention relates in general to electrical connections and more particularly to terminal connectors. It deals specifically with apparatus and a related method for programming electrical connections.

In the burgeoning world of electronics, with the advent of complicated electronic computers and the like, it has become common practice to provide relatively large connector plates as a base for a great number of terminal connections in corresponding circuits. Groups or blocks of terminal connectors form these connections. In practice, female type terminal connectors are set in groups in the connector plate while unitary blocks of male terminal connectors are set up to mate with specific groups of the female connectors, or vice versa, with groups of male connectors set in the plate and blocks of female connectors arranged to mate therewith. Electrical leads, of course, conventionally extend from both the male and female terminal connectors to appropriate connections in associated electrical equipment.

In practice, twenty to a hundred or more female terminal connectors might be congregated in one group, with numerous groups set in closely adjoining relationship constituting thousands of terminal connectors in a single connector plate. Each individual block of male terminal connectors must then be properly mated in a specific predetermined orientation with a particular group of female terminal connectors to complete correctly the multitude of electrical connections. Frequently it is desirable that these blocks of male terminal connectors be removably locked on the connector plate. Upon disconnection and subsequent re-connection it is imperative that the proper block of male terminal connectors be mated with the correct group of female terminal connectors in proper programmed or orientated relationship.

The problem of proper programming to prevent inadvertent connection of wrong groups of terminal connectors has been vastly complicated with the advent of complicated electronic devices where large numbers of substantially identical blocks of disconnectable terminal connectors are disposed in close proximity to one another. It will be understood that when the blocks of terminal connectors are disconnected for any purpose, it is imperative that they be re-connected with the proper groups of mating connectors and in the proper programmed or orientated relationship, for one misconnection can cause disastrous malfunction of a computer or computer-like device. Because of the bewildering array of substantially identical connections, it is often extremely difficult to ascertain a wrong connection. Accordingly, a general object of the invention is to provide an improved method and improved apparatus for programming electrical connections.

A more specific object of the present invention is to provide a substantially foolproof method and apparatus for preventing misconnection between mating blocks of terminal connectors.

Another object of the present invention is to provide an improved programming and orientating apparatus for preventing misconnection of groups of terminal connectors with respective mating connectors.

It is a further object of the present invention to provide a terminal connector housing having an orientating arrangement which assures mating the housed terminal block therein with a specific group of terminal connectors in a connector plate and prevents inadvertent misorientated connection of the terminal connectors.

An additional object of the invention is to provide an improved method for incorporating orientating apparatus in a housing for a block of disconnectable terminal connectors.

Still another object of the present invention is to provide an improved orientating key device for achieving foolproof programming of blocks of terminal connectors.

A still further object of the invention is to provide a simple and foolproof method for securing programming key devices with blocks of terminal connectors.

An important object of the invention is to provide improved apparatus for efficient and foolproof securing of programming keys in housing devices incorporating blocks of terminal connectors.

Other objects, features and advantages will be apparent from the following detailed description taken in conjunction with accompanying drawings in which.

Figure 1:
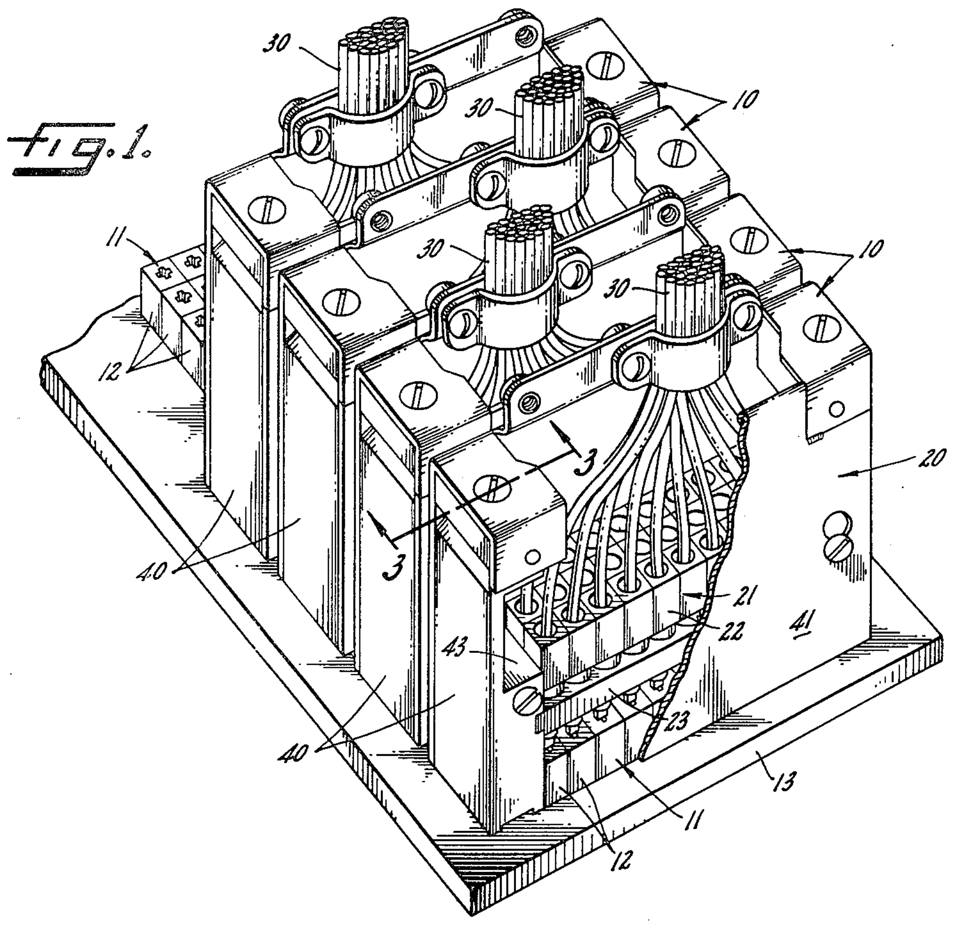
FIGURE 1 is a perspective, partially broken away view of a plurality of terminal connector and housing assemblies, embodying features of the present invention, in seated relationship on a portion of a terminal connector plate.

Referring now to the drawings, and particularly to FIGURE 1, a plurality of terminal connectors and housing assemblies embodying the features of this invention are shown generally at 10. Each of the assemblies 10 is mounted in mating relationship with a group 11 of female terminal connectors 12, preferably seated in self-locking relationship on a metallic connector plate 13 in the manner disclosed in the U.S. Patent No. 2,995,617, entitled "Self-Locking Terminal," issued August 8, 1961, and asigned to the assignee of the present invention. The connector plate 13 comprises a support structure for the group of female connectors 12.

Each assembly 10 includes a housing 20 which encloses a block or group 21 of male terminal connectors 22 mounted preferably in self-locking relationship, as disclosed in the aforementioned patent, on a metallic terminal block or board 23. The housing 20 with its associated parts constitutes a support structure for a corresponding block or group 21 of male terminal connectors 22. A block 21 of male terminal connectors 22 is, of course, adapted to mate with a corresponding group 11 of female terminal connectors 12 mounted on the connector plate 13. The mating arrangement is similar to that disclosed in a co-pending patent application, U.S. Serial No. 88,681, filed February 13, 1961, now Patent No. 3,086,074 and assigned to the assignee of the present invention.

Although the description relates to the use of female terminal connectors in the connector plate and male terminal connectors in a terminal board, it will be understood that these may be reversed without departing from the scope of the invention.

The housing 20 encloses the male terminal block 21 in predetermined orientated relationship and protects the terminal connectors 22 mounted therein from damage due to inadvertent contact by other equipment or personnel, for example. In addition, the housing 20 clamps the terminal connector wire leads 30 in a cable-like bundle to prevent them from being torn out of corresponding terminal connectors 22 by accidental means and also to maintain an orderly arrangement of the leads.

Figures 2, 4:
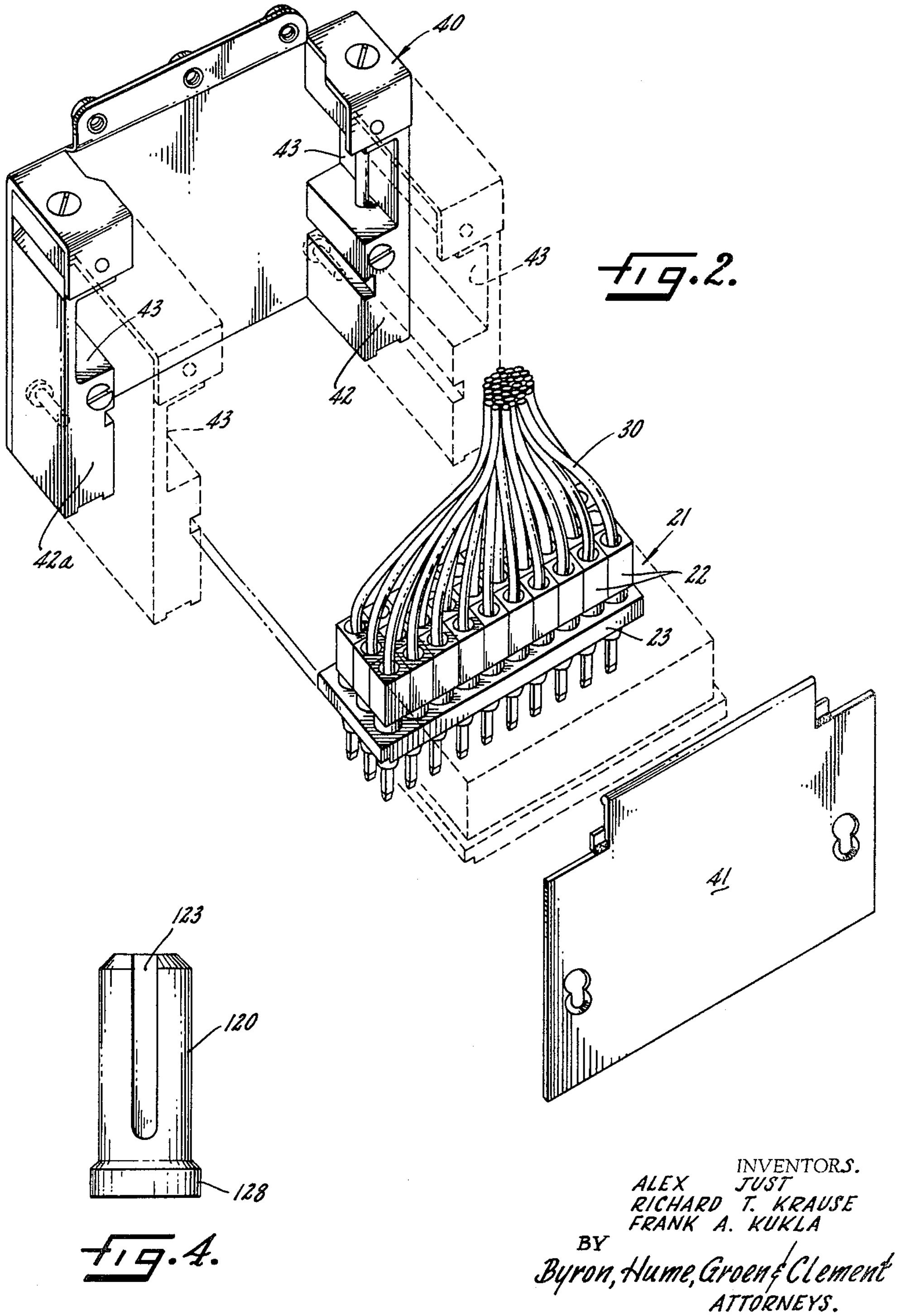
FIGURE 2 is an exploded perspective view of a terminal connector and housing assembly of FIGURE 1.
FIGURE 4 is a front elevational view of one of the housing orientation elements shown in FIGURE 3.

Referring now to FIGURE 2, it will be seen that each housing 20 includes a wall or body assembly 40 which receives the terminal block 21 within its confines in predetermined orientated relationship. The block 21 is retained in the housing by a cover plate 41. The body assembly 40 and the cover plate 41 cooperate to form the housing 20.

The body assembly 40 comprises an opposed pair of generally irregularly shaped side walls or end members 42 and **42*a*. The side walls 42 and 42*a* are preferably formed of extruded aluminum stock and are cut off at predetermined lengths to establish a preferred width for the housing 20. The side walls 42 and 42*a* are formed with relatively wide grooves 43 as shown. As will be seen in dotted lines in FIGURE 2, the side walls 42 and 42*a* might be longer or shorter depending upon the width of the terminal block 21 to be confined within the housing 20**.

The specific construction of the housings 20 and the terminal blocks 21 disposed therein is set forth in the parent patent application, Serial No. 191,987, of which the present application is a continuation-in-part, and accordingly, this description will not be repeated in detail in the present application. Suffice it to say that the construction might be substantially the same.

When a terminal block, such as the male connector block 21, is correctly seated in predetermined relationship within the body assembly 40 and the cover plate 41 is secured to the body assembly 40 to complete the housing 20, the terminal connector and housing assembly 10 is ready to be mated with a corresponding group 11 of female terminal connectors 12 in the connector plate 13. It is imperative, of course, that the proper assembly 10 be mated with the correct group 11 of female terminal connectors 12. In addition, it is imperative that this mating be accomplished in properly orientated relationship. In the latter instance, if an assembly 10 is inadvertently turned 180 degrees out of phase and mated with a group 11 of female terminal connectors in this relationship, the misorientation results in all of the electrical connections being improperly made, an obviously untenable result.

In addition, it is desirable, under most circumstances, for the terminal connector and housing assembly 10 to be rigidly secured to the connector plate 13 once a proper connection has been made between corresponding male and female terminal connectors associated therewith. Locking the entire assembly 10 in this manner prevents inadvertent disconnection of the mated terminal connectors 12 and 22 and consequently prevents the electrical circuits in which the terminals are incorporated from being broken at inopportune moments.

Figure 3:
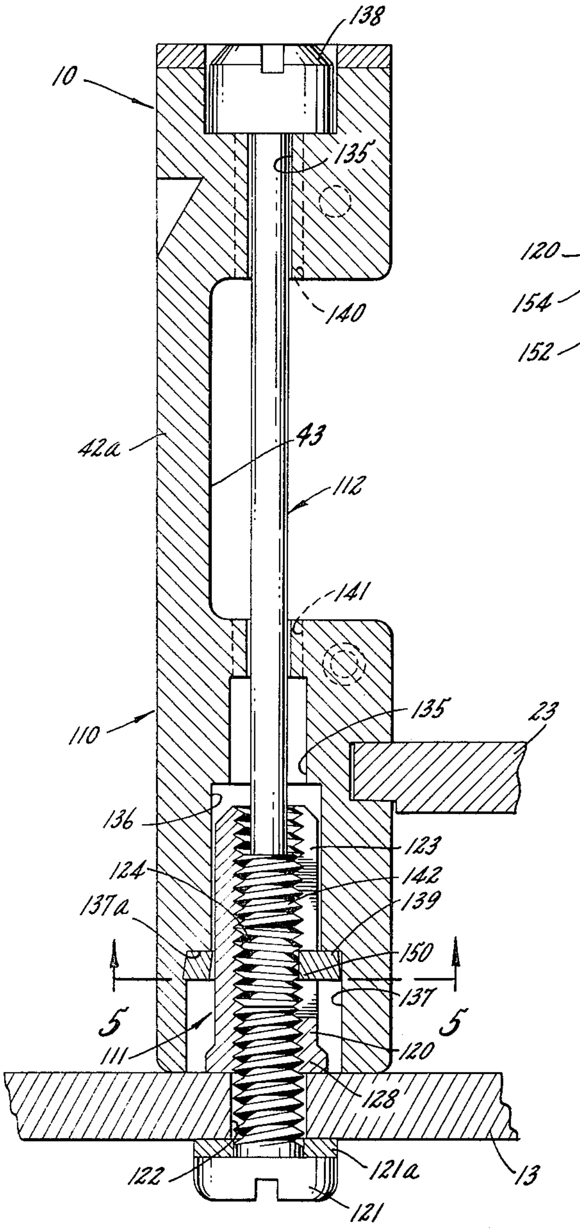
FIGURE 3 is an enlarged sectional view taken along line 3—3 of FIGURE 1.

Referring now to FIGURE 3, an orientation and locking arrangement for the terminal connector and housing assembly 10 is seen generally at 110. The orientation and locking arrangement 110 prevents the connector and housing assembly 10 from being mated with the wrong group 11 of female terminal connectors 12. It further removably secures the housing assembly 10 in rigidly mounted relationship on the connector plate 13. The orientation and locking arrangement 110 assures that the assembly 10 is seated in properly orientated relationship on the connector plate to mate the correct male and female terminal connectors and to positively prevent any mismating. The arrangement 110 can be programmed to provide a large number of completely individualistic relationships between various terminal connector and housing assemblies 10 and corresponding groups 11 of female terminal connectors 12. Consequently, the connector plate 13 containing a great number of groups 11 of female terminal connectors 12 can readily receive blocks 21 of mating male terminal connectors 22 without the slightest chance of an incorrect connection being made.

The orientation and locking arrangement 110 includes a pair of orientation devices 111 (only one of which is shown) mounted on the connector plate 13. The orientation devices 111 mate with and are rigidly connected to a corresponding pair of complementary programming devices 112 (only one of which is shown) incorporated in the housing 20. One of the programming devices 112 is incorporated in each of the side walls 42 and **42*a* of the housing 20, while each mating orientation device 111 on the connector plate 13 is appropriately positioned relative thereto. Only one mating pair of orientation devices 111 and programming devices 112** is shown and described since each pair is substanitally identical.

Each of the orientation devices 111 associated with the connector plate 13 comprises a stand-off sleeve 120 which is secured to the connector plate 13 by a fastening screw 121 extending through a washer **121*a* and an aperture 122 in the connector plate 13. Each standoff sleeve 120 has an orientation slot 123 (see FIGURES 3 and 4) for characteristically cooperating with the programming device 112 in the housing 20. The sleeve 120 is internally threaded, as at 124, to receive the locking screw 121 and also to assist in securing the housing 20 to the connector plate 13 through the medium of the orientation and locking arrangement 110**.

As seen in FIGURE 4, each stand-off sleeve 120 has a base portion 128 at its lower end. The base portion 128 rests on the connector plate 13 and is held there by means of the screw 121. When the screw 121 is tightened sufficiently, it fixes the position of the stand-off sleeve 120 about its axis. This is important since shifting of the sleeve 120 about its axis would cause corresponding circumferential shifting of the orientation slot 123 and would set up possible mismating of a male terminal connector block 21 with the incorrect group 11 of female terminal connectors 12 on the connector plate 13.

Each of the programming devices 112 associated with a corresponding side wall 42 or **42*a* of the housing 20 includes a stepped passage, seen generally at 135, which passes vertically through the side wall in question. The stepped passage 135 includes an intermediate portion 136 into which the upper end of a stand-off sleeve 120 may extend with substantial lateral and vertical clearance as shown in FIGURE 3. Each passage contains an orientation or program keying washer 139 secured in the relatively large lowermost section 137 of the stepped passage 135 against a shoulder 137*a* formed at the juncture of the passage sections 136 and 137. The keying washers 139 and the method and apparatus for securing the washers in the passage sections 137** constitute important features of the present invention.

Hold-down screws 138 extend downwardly through a portion of the stepped passages 135 and have a bottom end portion threadedly secured with the internal threads 124 of the stand-off sleeves 120. Internally threaded sections 140 and 141 in the passages 135 permit screwing the threaded end section 142 of the hold-down screws 138 through the passages 135 but prevent the hold-down screws 138 from inadvertently coming out of the passages 135 when the housing 20 is not mounted on the connector plate 13.

The programming washer 139 is similar to the programming washer of the parent application, Serial No. 191,987, in that each washer includes an integral inwardly extending ear or tang 150 which is adapted to mate with the slot 123 in a properly orientated stand-off sleeve 120 in order to program a particular group of male terminals for engagement with a predetermined group of female terminals in a predetermined orientation and thereby prevent inadvertent wrong electrical connections. However, the keying washers 139 of the present invention are otherwise different from those of the parent invention, and the method and apparatus for inserting the keying washers are considerably different and improved.

Figure 5:
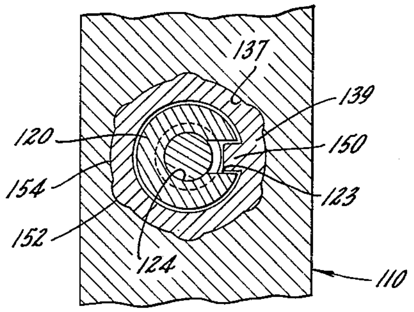
FIGURE 5 is a sectional view taken along line 5—5 of FIGURE 3.
Figures 7, 8:
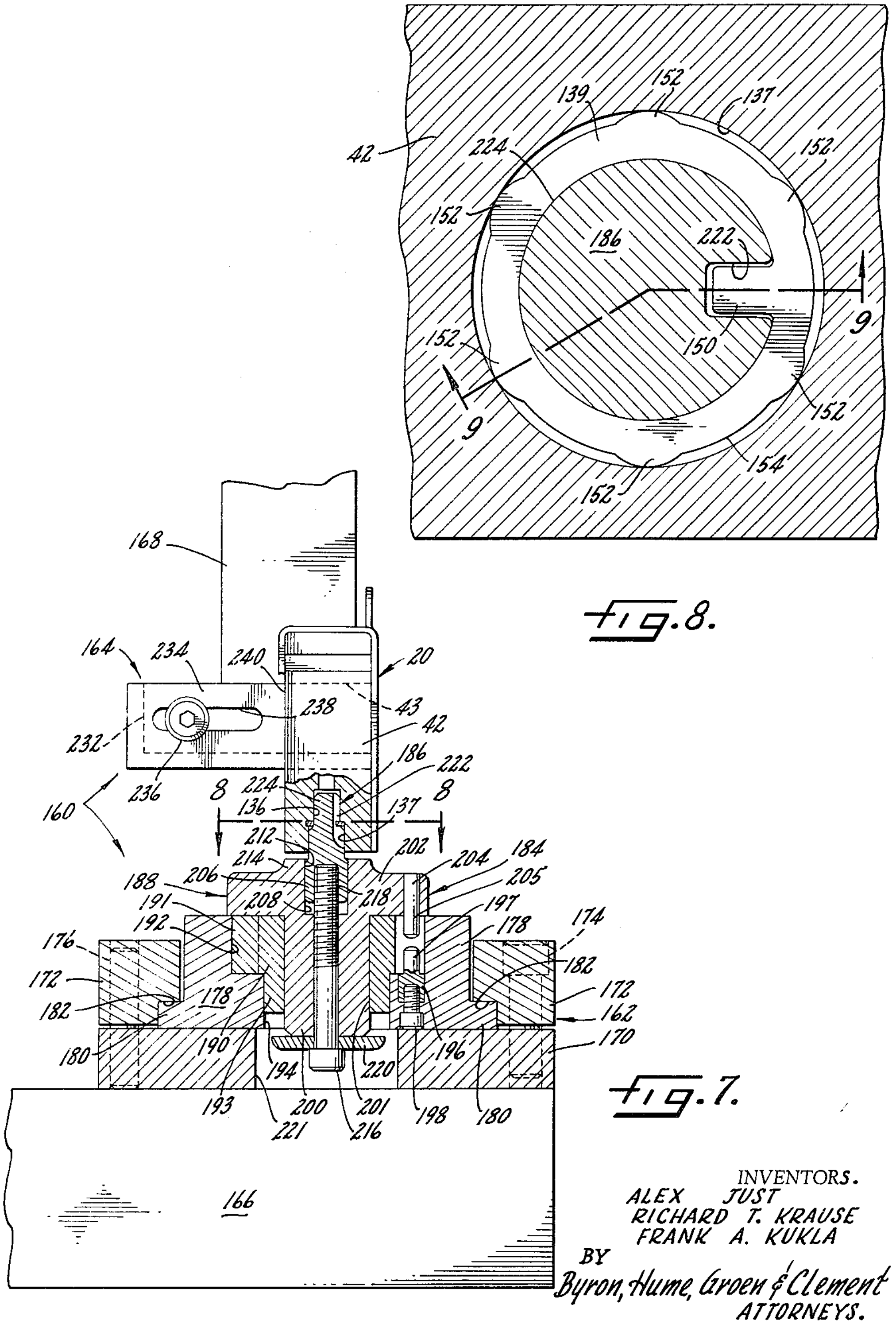
FIGURE 7 is a fragmentary sectional view taken along line 7—7 of FIGURE 6 with the parts shown immediately prior to final securing of a programming key.
FIGURE 8 is a greatly enlarged fragmentary, sectional view taken along line 8—8 of FIGURE 7 and showing a programming key according to the present invention immediately prior to final assembly.

According to the present invention, the keying washers 139 are formed with a plurality of integral, radially outwardly extending locking lugs or bumps 152 which are equi-angularly spaced about the outer periphery of the washer 139 as shown in FIGURES 5 and 8. These locking lugs 152 extend a substantial distance radially beyond the normal cylindrical outer periphery 154 of the washer. Each of these locking lugs 152 may extend, for example, three or four thousandths of an inch (.003" or .004") or more beyond the periphery 154 of a washer having a normal outside diameter of three tenths of an inch (.3"). The locking protrusions 152 are preferably rounded as shown. The portion of the periphery of the washer 139 containing the locking lugs 152 is substantially less than the extent of the normal cylindrical periphery portion 154. The washers 139 are manufactured so that the maximum outside diameter, namely, the diameter extending to the tips of the locking lugs 152, is slightly less than the diameter of the lower passage portion 137 within the housing ends 42 or **42*a*. Thus, the washers may be freely inserted into the passages 137 without gouging the walls of the passage 137 or destroying any protective coating which may be provided on the walls of the passage 137**.

Basically, the method of the present invention comprises inserting the keying washer 139 into the passage portion 137 in exactly angularly orientated position with respect to the end portion 42 or **42*a*, spacing the washer 139 axially (as 137*a*) against the shoulder and then expanding the washer 139 radially beyond the elastic limit but less than the ultimate strength of its material to cause the locking lugs 152 to bite into localized areas of the wall of the passage 137. Ideally, the washer 139 is expanded radially a sufficient amount that the normal outer periphery 154 of the washer just touches, but does not exert any pressure against, the wall of the passage 137. Since the washer 139 is expanded beyond its elastic limit, but not sufficiently to cause fracture or serious weakening thereof, it remains in its expanded position with the locking lugs 152 firmly biting into the wall of the passage 137. Thus, the washer 139 is locked in a preselected orientation with the locking lugs 152 creating peripherally spaced localized positions of high pressure which cause the washer 139 to be held with great rigidity in an exactly desired, orientated position. The result is a keying washer 139 which is permanently held in the positioning passage 137** to resist torsional forces as well as axial forces tending to dislodge it.

By reason of the fact that the keying washers 139 of the present invention are firmly secured within the positioning passages 137 by areas of highly concentrated, but peripherally spaced, force, there is no tendency to crack the walls of the members 42 and **42*a* during insertion of the washers 139. This tendency to crack the walls was a difficulty in the use of press-fit keying washers as disclosed in the parent application, Serial No. 191,987. In addition, the insertion method of the present invention permits the keying washers 139 to be inserted without destroying the protective coating on the walls of the passage portions 137, which occurred upon insertion of press-fit washers according to the parent application. The axial retention and the torque resistance of keying washers 139 constructed and inserted according to the present invention are greatly increased over those of the washer disclosed in the parent case. Furthermore, the washers 139** are much more readily inserted and more accurately placed, which substantially reduces the cost of the orientating operation.

Another important, but unobvious, advantage is achieved through the present invention in that the keying washers 139 can be inserted in the positioning passages 137 slightly off center from the axes of the passages 137. This is permitted by reason of the extreme holding power of the locking lugs which bite deeply into the material of the positioning passages 137 at peripherally spaced positions. According to the prior concept disclosed in the parent application, it was necessary to construct the connector housings 10 and the keying washers with considerable precision and to locate the passages 137 and the respective end walls 42 and **42*a* within close tolerances in order that the centers of the finally inserted keying washers would be located within the permissible tolerances for placement of the stand-off keys 120** with which they were designed to mate. In other words, the prior concept required that the diameter of the positioning passages, the distance between the positioning passages and the dimensions of the keying washers be very precisely manufactured. By contrast, in the present invention, as will be more apparent hereinafter, the tolerances for these dimensions may be increased, thereby reducing the cost of manufacture.

Tolerance build-up is compensated for in the present invention upon final assembly of the keying washers 139 by substantially simultaneously inserting the washers 139 in the two end walls 42 and **42*a* with their spacing determined with extreme accuracy. By reason of the construction of the washers 139 and their unique coaction with the walls of the locating passages 137, the washers 139 will permanently remain where they are positioned, even if this position be relatively far off-center with respect to the positioning passages 137. This accurate spacing between the washers 139 can be achieved through the use of an assembly fixture or tool, such as that to be described for performing the method of insertion of the present invention. Upon final insertion of the keying washers 139, all tolerance build-up is compensated for and the washers 139 are located and fixedly positioned within the housing ends 42 and 42*a* with their centers very accurately located with respect to one another so that they will mate perfectly with the stand-off sleeve 120**.

It will be seen that the keying washers 139 may be inserted, properly orientated, and fixed in position through the use of hand tools. However, the operation may be performed much more readily and efficiently and the keying washers can be more accurately placed through the use of an indexing and inserting fixture according to the present invention. This fixture is illustrated in FIGURES 6–11 and is generally designated by the reference numeral 160.

The indexing fixture 160 includes a stationary base assembly 162 and a movable ram assembly 164. The base assembly 162 is fixedly secured in any suitable manner to the bolster plate 166 of a press, such as a small arbor press (fragments only shown), while the ram assembly is fixedly secured to the movable ram 168 of the same arbor press.

The fixture base assembly 162 includes a base plate 170 which has a pair of parallel guide and clamping rails 172 fixedly and accurately secured thereto by means of a plurality of cap screws 174 and dowel pins 176. A pair of fixture blocks 178 are adapted to be accurately positioned and securely clamped to the base plate 170 through integral side flanges 180 formed along opposite lower peripheral edges of the fixture blocks 178. The side flanges 180 are fitted in longitudinal undercuts 182 formed in the guide rails 172. The undercuts 182 are slightly smaller in depth than the thickness of the side flanges 180 of the fixture blocks 178, so that when the cap screws 174 are securely tightened, the fixture blocks 178 are fixedly positioned. It will be seen that the positions of the fixture blocks 178 with respect to the base plate 170 can be adjusted by loosening the cap screws 174 and then re-tightening the cap screws 174 after the fixture blocks 178 have been located in a desired new position relative to the base plate 170 and to one another.

Each of the fixture blocks 178 carries an adjustable orientating assembly 184. Each orientating assembly 184 includes an orientating and expanding post or tool 186 carried by an orientation locator 188 which, in turn, is carried and accurately orientated by an orientation positioner 190.

The orientation positioner 190 may conveniently take the form of a spur gear having a gear tooth portion 191 which is disposed in a close fitting recess 192 formed in the center portion of the fixture block 178. The depth of the recess 192 is such that the top face of the gear 190 is substantially flush with the top surface of the block 178. An integral hub portion 193 of the gear 190 is accurately slip-fitted in a reduced diameter bore 194 which is axially aligned with the recess 192.

In order to hold the positioner gear 190 in a given position when it is seated in the recess 192, a locator pin 196 (FIGURE 7) is held in a counterbored recess by means of a screw 198. The screw is disposed in an aligned counterbored recess below the pin 196 and is threadedly secured in a threaded recess in the pin. A locator portion 197 of the locator pin 196 accurately fits in the space between two adjacent teeth 191 of the gear positioner 190. To prevent axial displacement of the positioner gear 190, a lock screw 199 (FIGURE 6) is threadedly inserted into the side of each fixture block 178 and firmly abuts the side of the hub portion 193 of the gear 190. A jam nut **199*a* is threadedly disposed on the outward end portion of the lock screw 199 and jammed against the side of the fixture block to prevent inadvertent loosening of the lock screw 199**.

The orientation locator 188 includes a cylindrical stem portion 200 which is accurately slipfitted in a central axial bore 201 formed through the gear positioner 190. A knurled integral angular flange or dial portion 202 of the orientation locator 188 is disposed with its lower face against the upper face of the gear positioner 190. A positioning pin 204 is press fitted in an axially extending aperture formed in the outer edge of the dial portion 202 and has a downwardly extending locator portion 205 closely fitting in a groove between two adjacent teeth 191 of the gear positioner 190 in order to position accurately the orientator locator 188 with respect to the gear positioner. The locator pin 204 is not necessarily disposed between the same gear teeth as the positioning pin 196, although they may be so positioned as shown in FIGURE 8.

The orientating post 186 includes a cylindrical bottom stem portion 206 which is accurately slipfitted into a mating centrally located axial bore 208 formed in the center of the orientation locator 188. An integral (or press fitted) laterally extending base portion 210 is accurately fitted into a transverse machined slot 212 formed across an integral upper boss 214 of the orientation locator 188 in order to accurately orientate the post 186 with respect to the orientation locator 188. The orientating post 186 is fixedly, but removably, secured in the axial bore 208 by means of a securing screw 216 which has its upper end portion threadedly secured in a threaded recess 218 formed in the lower portion of the post 186. The head of the securing screw 216 bears against a retainer washer 220 which, in turn, bears against the bottom end of the stem portion 200 of the orientation locator 188. The stem portion 200 extends below the bottom edge of the hub portion 193 of the gear positioner 190 and the washer 220 is somewhat larger in diameter than the stem 200, but smaller in diameter than the bore 194. A transfer slot 221 is formed in the base plate 170 in order to accommodate the lower end of the stem 200 and the washer 220 when the fixture blocks 178 are adjusted in position. The distance between the upper face of the retainer washer 220 and the lower surface of the stem 193 is slightly greater than the length of the locator portion 205 of the positioning pin 204 so that the orientation locator 188 may be pulled upwardly and the positioning pin 204 may be located in any desired gear tooth groove of the orientation gear 190.

Figure 9:
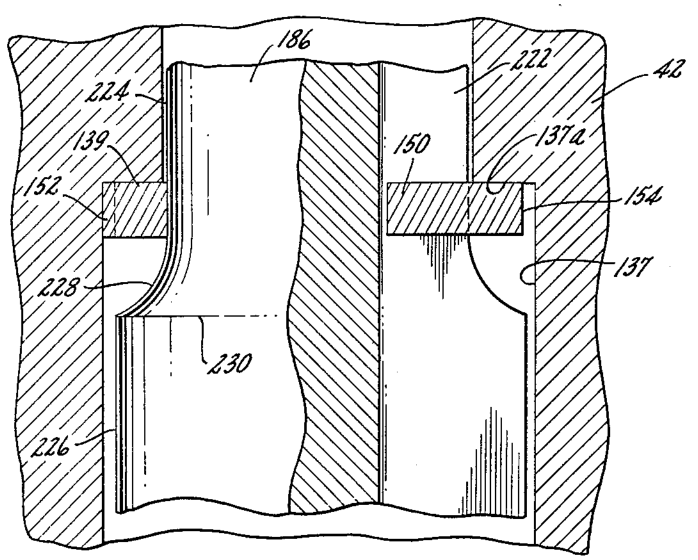
FIGURE 9 is a fragmentary sectional view taken along line 9—9 of FIGURE 8.

The orientating post 186 is provided with a vertically extending locating groove 222 in the side thereof which is of a depth and width sufficient to receive the locating tang 150 of a keying washer 139 in close fitting slidable relation. An upper portion 224 of the post 186 is of cylindrical configuration with a diameter sufficient to receive the inner periphery of the keying washer 139 in close fitting slidable relation (FIGURES 8 and 9). A succeeding portion 226 of the orientating post 186 is also of cylindrical configuration, but having a somewhat larger diameter which will fit with substantial clearance in the positioning passage 137. The two portions 224 and 226 are integrally connected through an expanding neck portion 228 which takes the form of an annular, concavely flared fillet smoothly converging to the diameter of the upper portion 224 at its upper end and in a relatively sharp shoulder 230 at the lower junction with the cylindrical portion 226 of the orientating post 186.

The ram assembly 164 (FIGURES 6 and 7) includes a U-shaped guide block 232 fixedly secured at the bottom end of the arbor press ram 168 by suitable means, such as screws or the like (not shown). The guide block 232 has a base portion and two leg portions, the latter straddling the ram assembly 164 when the guide block 232 is fixedly secured thereto. The guide block 232 has a pair of adjustable slide stops 234, each being disposed on the outer portion of the legs of the guide block 232. The slide stops 234 are adjustably secured to the guide block 232 through the use of a pair of capped screws 236 (only one shown) threadedly secured to the guide block 232 and having their shanks riding in adjustment slots 238 formed in the slide stops 234. The ends 240 of the slide stops 234 are adapted to abut against the surfaces of ends 42 and **42*a* of the connector housing 20. The legs of the guide block 232 are of a depth and width just sufficient to be snugly slidably received in the opposed grooves 43 of a housing 20 which has its cover plate 41 removed. The arbor plate ram 168 is sufficiently narrower than the guide block 232 that it will readily fit between the end walls 42 and 42*a* without engaging the housing 20. The positions of the slide stops 234 are adjustable in order to accommodate the width of the housing 20, bearing in mind that housings of substantially varying width are contemplated. As the width of the housing is increased, the slide stops 234 are moved to the left as seen in FIGURE 7 so that when the ends 240 of the slide stops 234 engage the side edges of the end walls 42 and 42*a* the passages 135 formed vertically in these end walls 42 and 42*a* are axially aligned with the orientating posts 186. The fixture blocks 178 must also be adjusted in the opposite direction to align the orientating posts 186 with the passages 135 if housings with different spacing between the end walls 42 and 42***a* are utilized.

Figure 6:
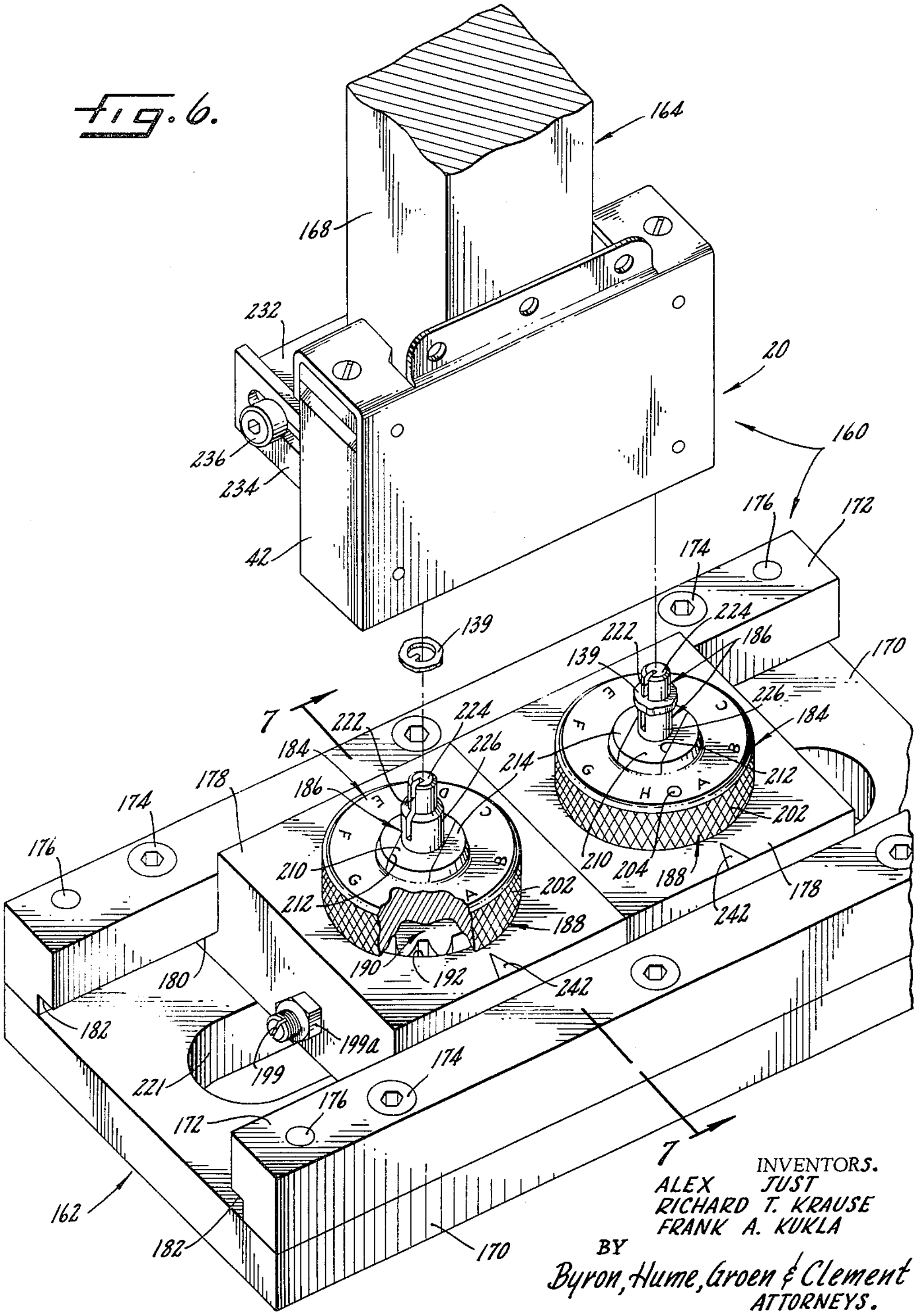
FIGURE 6 is a perspective view of an apparatus for orientating and assembling programming key devices for acomplishing selective programming of blocks of terminal connectors according to the present invention.

In order to index the various positions of the keying slots 222 in the orientating posts 186, each of the orientation locators 188 is provided with appropriate index markings or positions equally spaced about the outer periphery on the upper face. For example, "A," "B," "C," etc. may be utilized, as shown in FIGURE 6. An indicator marking 242 is scribed on each of the fixture blocks 178 in an appropriate position immediately outwardly of the outer periphery of the orientation locator 188. These indexed markings 242 may take the form of arrows or arrow-like markings as shown. The index markings are equally spaced about the periphery of the orientation locator 188 in order to correspond to the angular displacement of each gear tooth groove of the gear positioner 190, or to every other gear tooth groove, or perhaps every third gear tooth groove, depending upon the number of index positions desired.

In a commercial embodiment of the invention, fifteen index positions are utilized, thus providing twenty-four degrees (24°) between each position. It is convenient to utilize a gear positioner 190 having a number of teeth corresponding to the number of index positions. It has been found that when fifteen index positions are utilized, relatively large manufacturing tolerances are permissible which reduce assembly time, rejects and costs. Of course, it will be understood that many more indexing positions may be provided depending upon the permissible tolerances and the relative sizes of the parts.

When a particular connector housing 20 is to be programmed, the housing with cover plate 41 removed is disposed on the ram assembly 164, after adjustments have been made to accommodate the size of the particular housing, in the manner described hereinbefore. If necessary, the positions of the fixture blocks 178 are also adjusted to accommodate the particular housing 20 being programmed. It will be understood, however, that the fixture blocks 178 are so located that the orientating posts 186 are spaced in accordance with the exact spacing of the stand-off sleeves 120 with which the housing 20 will eventually meet and, furthermore, that any tolerance build-up is eliminated when the programming washers 139 are finally set in place in accordance with the method and apparatus of the present invention.

After the indexing fixture 160 has been set up to accommodate the particular size of connector housing 20, any number of connector housings of that size may be programmed, and each with a different program setting up to the maximum number possible, which is dependent upon the number of teeth in the gear positioners 190. It will be understood, for example, that if each of the orientating locators 188 is constructed to provide fifteen different angular positions for the keying slot 222, then the indexing fixture 160 can provide nearly 225 housings with a different program setting. Of course, the maximum number of program settings will be determined by the number of program settings for each orientation locator.

When it is desired to provide a particular program setting for a housing 20, the orientation locators 188 are each adjusted to the particular setting desired. For example, referring to FIGURE 6, both the right-hand and the left-hand orientation locators may be set to the index setting "A" as shown, or any other combination of the settings may be utilized. A keying washer 139 is then placed loosely on each of the orientating posts 186 with the keying tangs 150 disposed in the keying grooves 222. At this time the programming washers 139 are resting at the upper portion 224 of the two orientating posts 186.

In order to fix the programming washers 139 in place within the housing 20, the arbor press ram 168, with the housing 20 secured thereto, is moved downwardly. When the ram 168 has moved downwardly a sufficient amount, the washers 139 enter the passages 137 in the housing ends 42 and 42*a* until the shoulders 137*a* bear against the top surfaces of the washers 139. The condition of the parts at this instant is depicted in FIGURE 9. As the ram 168 completes its downward movement, the housing ends 42 and 42*a* move from the position shown in FIGURE 9 downwardly to the position shown in FIGURE 10. This, of course, is the effective portion of the stroke during which the orientating washers 139 are finally located and permanently set in predetermined orientated positions in the housing 20.

During this portion of the stroke, the expanding neck 228 of the orientating post 186 presses outwardly against the inner periphery of the keying washers 139 to cause the washers 139 to expand radially so that the metal in the washer stresses beyond its yield point, but not beyond its ultimate strength. Accordingly, the locking lugs 152 of the washer 139 bite deeply into the walls of the passage portions 137 immediately below the locating shoulder 137*a*. The downward movement of the ram is continued preferably until the outer periphery 154 of the washer 139 just engaged the wall of the passage 137 without exerting any appreciable pressure against the wall. Thus when the ram is retracted upwardly, the programming washers 139 remain in the securely locked positions shown in FIGURE 10.

During the final washer setting stroke of the ram, as the washer is driven downwardly onto the expanding shoulder 228, the washer 139 is caused to expand unevenly, as shown, by reason of the fact that the expanding force acts principally upon the bottom edge portions of the washer 139. For this reason, the bottom edge portions of the locking lugs 152 expand more and therefore bite more deeply into the walls of the passage 137 than do the upper edge portions of the locking lugs 152. This has an advantageous effect in that the washers 139, when finally set, have great resistance to downward movement and therefore will not drop out. Of course, upward movement of the washer 139 is prevented by the shoulder 137*a*.

Figures 10, 11:
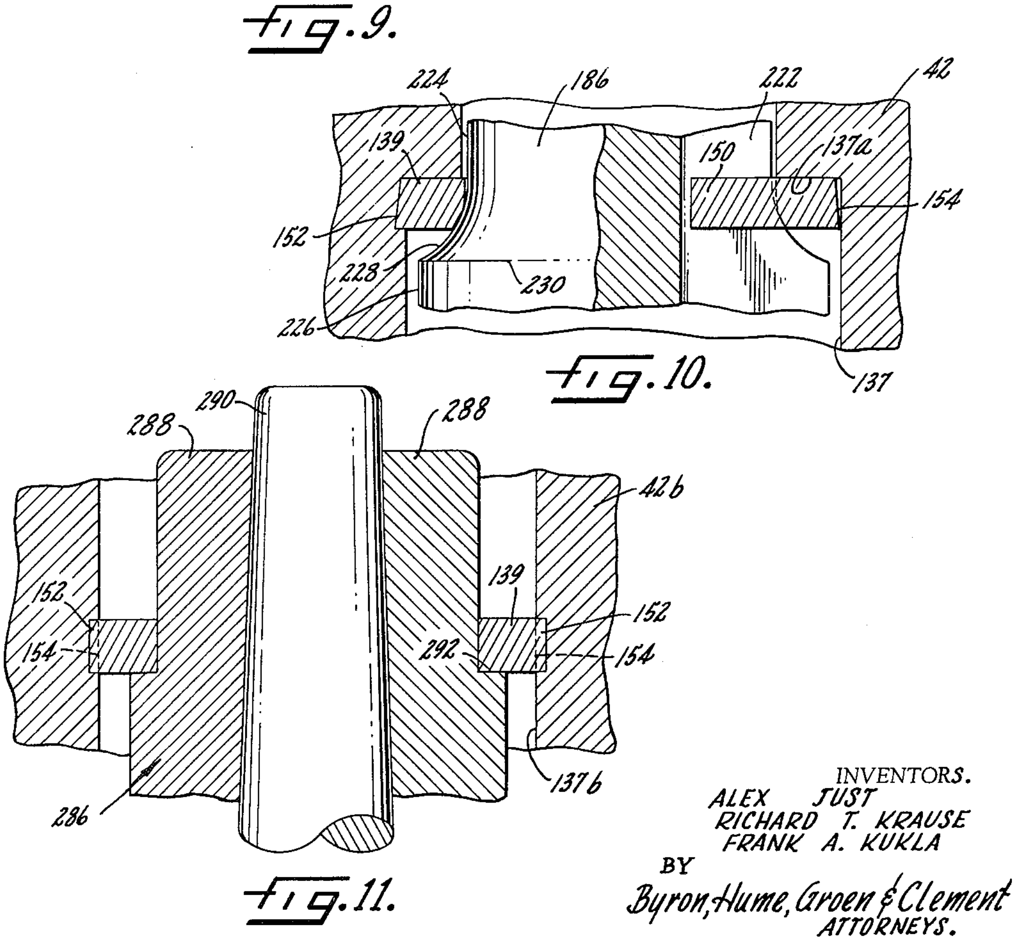
FIGURE 10 is a fragmentary sectional view similar to FIGURE 9 but showing the programming key after completion of the assembling operation.
FIGURE 11 is a fragmentary sectional view similar to FIGURE 10 but illustrating an alternative form of a device for final assembly of a programming key according to this invention.

An alternative type of orientation post or tool is depicted in FIGURE 11. In this figure an orientation and expanding post 286 is provided which comprises at the upper portion thereof an expanding collet 288 of two or more separable parts surrounding a conically tapered expanding pin 290. The portions of the collet 288 are formed with an upwardly facing annular shoulder 292 adapted for receiving and retaining a programming or keying washer 139. The collet 288 also includes a keying slot (not shown) for receiving the keying tang 150 of the programming washer 139. This revised type of orientating and expanding post 286 may be used, for example, in a housing end wall 42*b* (shown fragmentarily only) having a washer receiving passage 137*b* of approximately the same diameter as the passage 137 of the end walls 42 and 42*a*, but without the shoulder 137*a* of the prior embodiment.

In this FIGURE 11 embodiment, the final portion of the stroke of the ram of the indexing fixture causes the expanding collet 288 to be moved downwardly on the tapered pin 290 in any suitable manner (not shown). Thus, in this final movement, the expanding collet 288 and the housing end wall 42*b* are stationary relative to one another, while the taper pin 290 is moved upwardly relative thereto. This causes the portions of the expanding collet 288 to be expanded radially at right angles to the wall of the passage 137*b* which causes the locking lugs 152 to bite deeply and evenly into the wall thereof. In this manner, the locking washer 139 is exactly positioned in the passage 137*b* by means of the expanding collet. After the washer is finally set, it is equally resistant to axial displacement in either direction.

The apparatus and method relating to the FIGURE 11 embodiment is otherwise identical with that of the embodiment of FIGURES 6–10, and an identical programming washer 139 may be utilized in connection with the FIGURE 11 embodiment.

From the foregoing description, it will be understood that the present invention provides improved apparatus for accomplishing completely individualized programming of inter-connection between disconnectable groups of male and female terminals. The invention also encompasses improved apparatus and method for accomplishing the programming of the terminal connectors.

Modifications and variations may be effected without departing from the scope of the novel concepts of the present invention.

We claim:

1. In programming apparatus for a pair of groups of disconnectable electrical terminals, each group of which is carried by a support structure and including an orientation device having an external surface and secured to one of said support structures in a specific orientation, the improvement comprising a programming device engageable with said orientation device in one angular orientation only, said programming device comprising a washer member having a peripheral surface with a plurality of spaced lugs formed thereon, said washer member being expanded so that said lugs are imbedded in the other of said support structures to fixedly secure said programming device to said other support structure in said one angular orientation, said washer member having an internal surface engageable with said external surface of said orientation device in said one angular orientation only.

2. Programming apparatus according to claim 1 including a pair of said orientation devices secured to said one support structure, and a pair of said programming devices each secured to said other support structure in the angular orientation of one of said orientation devices only.

3. Programming apparatus according to claim 1 wherein the extent of the portion of the peripheral surface of said washer member containing said lugs is substantially less than the extent of the remaining portion of the peripheral surface.

4. Programming apparatus for a plurality of mating pairs of groups of disconnectable electrical terminals with one group of each pair being carried by a base member and with each other group of each pair being individually carried by separate support structures, said programming apparatus comprising an orientation device secured to said base member adjacent each of said one group of each pair and each in a different angular orientation, and a programming device associated with each of said separate support structures and engageable with said orientation devices in said different angular orientations only, each of said programming devices having a peripheral surface with a plurality of spaced lugs formed thereon imbedded in the respective support structures of said other groups to fixedly secure the programming devices thereto each in the angular orientation of the orientation device adjacent the one group of each mating pair, each of said programming devices comprising a washer member having an internal integral tang adapted for engaging with said orientation devices in said different angular orientations only, each of said washer members having its peripheral surface formed generally cylindrical with said lugs being equally spaced about the periphery thereof, said lugs being rounded and formed integrally with said washer member.

5. Programming apparatus according to claim 4 including a pair of said orientation devices secured adjacent each of said one group of each pair, and a pair of programming devices secured to each of said support structures each in the angular orientation of only one of the orientation devices adjacent the one group of each mating pair.

6. Programming apparatus according to claim 5 wherein the extent of the portion of the peripheral surface of each of said washer members containing said lugs is substantially less than the extent of the remaining portion of the peripheral surface.

References Cited by the Examiner

UNITED STATES PATENTS

| | | | |
|---|---|---|---|
| 2,049,585 | 8/36 | Gunthorp | 339—221 |
| 2,577,810 | 12/51 | Rosan | 151—41.72 X |
| 2,782,491 | 2/57 | Cole | 29—155.5 |
| 2,902,665 | 9/59 | D'Amico | 339—184 |
| 2,938,200 | 5/60 | Dupree | 339—184 |
| 2,995,617 | 8/61 | Maximoff et al. | 339—94 X |
| 3,067,496 | 12/62 | Rayburn | 29—203 |
| 3,085,221 | 4/63 | Kelly | 339—186 |
| 3,085,321 | 4/63 | Douglas | 29—203 |
| 3,086,074 | 4/63 | Just et al. | 339—221 X |
| 3,093,887 | 6/63 | Prestige et al. | 29—155.5 |

JOSEPH D. SEERS, *Primary Examiner.*

W. DONALD MILLER, *Examiner.*